United States Patent [19]

Laferty et al.

[11] 4,444,733

[45] Apr. 24, 1984

[54] PROCESS FOR RECOVERING MOLYBDENUM AND COPPER FROM SULFIDE CONCENTRATES

[75] Inventors: John M. Laferty, Wheat Ridge; Dale K. Huggins; John D. Bruno, both of Golden, all of Colo.

[73] Assignee: Amax Inc., Greenwich, Conn.

[21] Appl. No.: 470,339

[22] Filed: Feb. 28, 1983

[51] Int. Cl.³ .................... C01G 3/00; C01G 39/00
[52] U.S. Cl. .................................. 423/24; 423/27; 423/53; 423/54; 423/61
[58] Field of Search .................. 423/24, 27, 53, 54, 423/61

[56] References Cited

U.S. PATENT DOCUMENTS

| | | | |
|---|---|---|---|
| 1,895,811 | 1/1933 | Morgan | 423/53 |
| 2,187,750 | 1/1940 | Marvin | 423/61 |
| 3,576,595 | 4/1977 | Chiola et al. | 423/54 |
| 4,298,582 | 11/1981 | Menashi et al. | 423/53 |
| 4,320,094 | 3/1982 | Menashi et al. | 423/53 |

OTHER PUBLICATIONS

Dresher et al., "Journal of Metals", Jun. 1956, pp. 794–800.

Primary Examiner—Herbert T. Carter
Attorney, Agent, or Firm—Michael A. Ciomek; Eugene J. Kalil

[57] ABSTRACT

A hydrometallurgical process is provided for the recovery of molybdenum values from a molybdenum disulfide concentrate containing copper. The process comprises forming an aqueous slurry of finely divided molybdenum concentrate of carbonates and hydroxides of alkali metals, and pressure leaching the slurry in the presence of oxygen at an elevated temperature and pressure for a time sufficient to effect conversion of the contained molybdenum values to alkali metal molybdate and provide a residue containing copper oxide or basic copper carbonate from which copper is later recovered. The molybdenum values are recovered from solution by solvent extraction and the solvent thereafter stripped of the molybdenum as ammonium molybdenum using ammonium hydroxide. The molybdenum is recovered as crystals of ammonium molybdate by crystallization, e.g., by evaporating the stripping solution.

12 Claims, 1 Drawing Figure

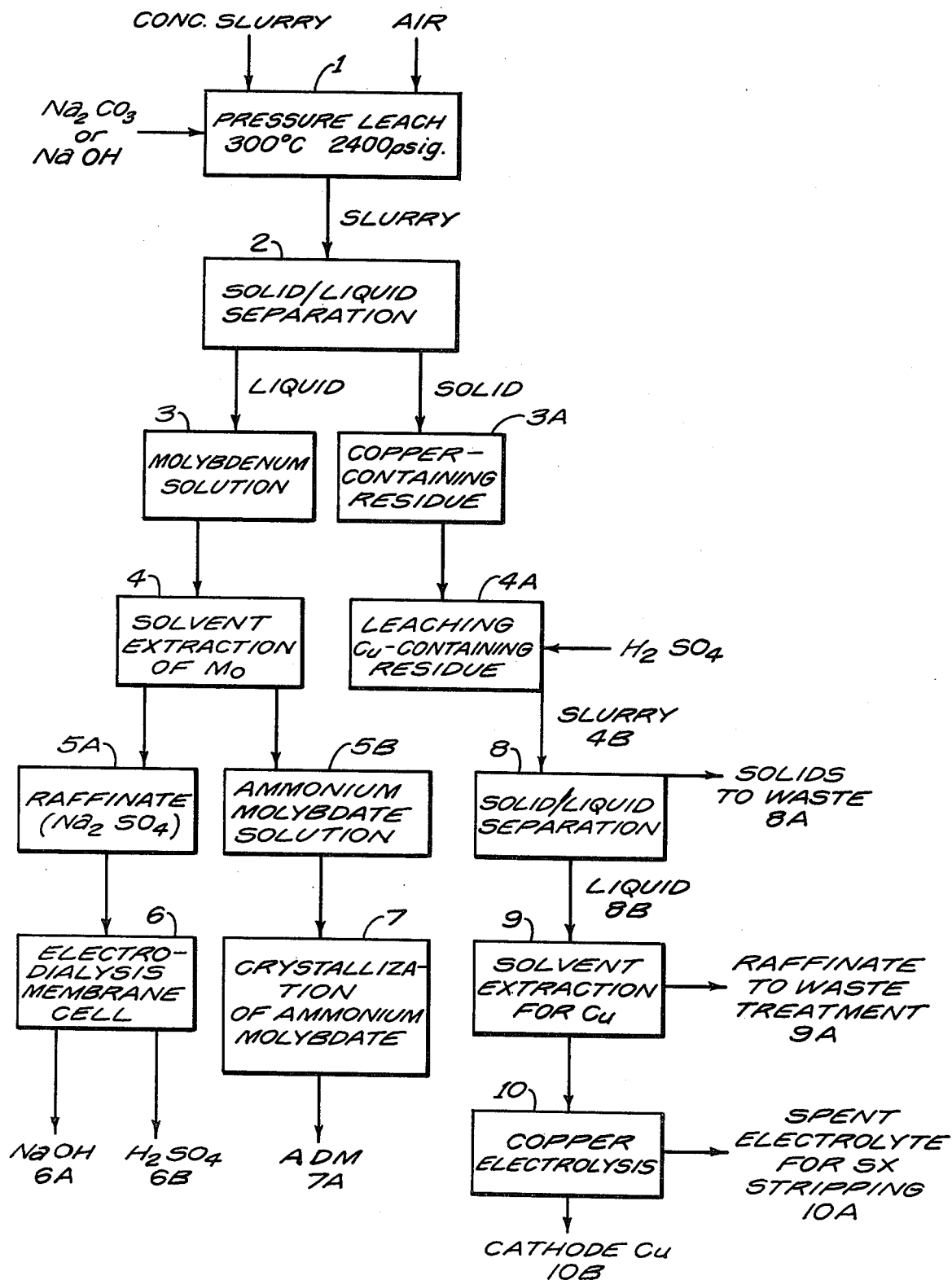

PROCESS FOR RECOVERING MOLYBDENUM AND COPPER FROM SULFIDE CONCENTRATES

This invention relates to a hydrometallurgical process for the recovery of molybdenum and copper values from molybdenum sulfide concentrates.

STATE OF THE ART

In the mining and treatment of molybdenum sulfide ore containing copper, or copper sulfide ore containing molybdenum, the mined ore in finely divided form is subjected to flotation to produce a molybdenum disulfide concentrate or molybdenite which also contains some copper. A typical sulfide concentrate is one containing about 40% to 55% molybdenum, about 0.2 to 5.0% copper and the balance combined sulfide, gangue impurities and small amounts of metal impurities, either as sulfides and/or oxides.

One method of removing the copper from the molybdenum sulfide concentrate is to leach it with an aqueous solution of ferric chloride and the molybdenite remaining then roasted to $MoO_3$. A by-product of roasting is $SO_2$ which, depending on its concentration in the flue gas, is a valuable source of sulfuric acid. In some roasting systems, excess air is used as a means for attaining higher production rates which usually results in diluting the flue gas to such an extent that it customarily contains only 1 to 1.5% sulfur dioxide. Such flue gases do not lend themselves to recovery, as established systems require more than 1.5% sulfur dioxide for economic recovery. Under such conditions, the sulfur dioxide is generally wasted to the atmosphere, thus losing potential sulfur values and contributing to air pollution.

In some locations, the use of tall chimneys has been effective in controlling ground level concentrations of sulfur dioxide below generally recognized harmful limits. However, there is growing concern that this solution will not be acceptable at all locations where it may be desirable to operate a molybdenum conversion facility. Recent government legislation has placed a limit as to the quantity of sulfur dioxide which may be safely emitted at any given location.

A known roasting procedure which avoids the aforementioned problem is that disclosed in U.S. Pat. No. 4,221,588, assigned to the same assignee, which employs a special spray-cooling technique for controlling the roasting temperature and for assuring a fairly high $SO_2$ concentration useful for sulfuric acid production.

We have developed a process whereby we can avoid air pollution by employing a hydrometallurgical technique in which the sulfur is converted into a soluble sulfate salt and the salt, if desired, later converted to sulfuric acid.

OBJECTS OF THE INVENTION

It is an object of the invention to provide a hydrometallurgical process for the recovery of molybdenum from sulfide concentrates.

Another object is to provide a hydrometallurgical process for the leaching of molybdenum sulfide concentrates to recover molybdenum therefrom and optionally copper as a by-product.

These and other objects will more clearly appear when taken in conjunction with the following disclosure and the accompanying flow sheet.

STATEMENT OF THE INVENTION

A process has been developed which provides for very high recovery of both molybdenum and copper values. Air pollution is substantially eliminated with all of the sulfur being converted to a soluble salt comprising $Na_2SO_4$ which may be further converted, if desired, to NaOH for recycle to wet air oxidation (WAO) in the process and also to $H_2SO_4$.

Briefly stated, one embodiment of the invention is directed to a hydrometallurgical process for the recovery of molybdenum from molybdenite or molybdenum disulfide concentrate which may contain copper in amounts ranging by weight from about 0.5% to 5.0%, the process comprising, forming an aqueous slurry of finely divided molybdenum concentrate with an alkali metal compound selected from the group consisting of carbonates and hydroxides of alkali metals, the amount of alkali metal compound being sufficient to react with all of the sulfur and molybdenum present and sufficient excess to provide a terminal pH of at least about 8, and pressure leaching the slurry in the presence of oxygen at an elevated temperature and pressure and for a time sufficient to effect conversion of the molybdenum values to alkali metal molybdate and provide a pregnant liquor thereof. During leaching the copper values are converted to insoluble copper oxides or basic copper carbonates. The process further comprises separating the pregnant liquor from the solids of the reacted slurry, the solids containing copper values, adjusting the pH of the pregnant liquor with $H_2SO_4$ to a range of about 7 to 9, and filtering the pH-adjusted pregnant liquor to remove impurities therefrom and provide a purified filtrate. The filtrate is then treated by reducing the pH thereof to a range of about 2.2 to 4.5, subjecting the filtrate to a solvent extraction step to remove the molybdenum values therefrom, the solvent extractant being one which is selective to an ammonium hydroxide stripping solution, and then stripping molybdenum values from the solvent with an ammonium hydroxide solution of concentration sufficient to recover the molybdenum values therefrom as ammonium molybdate.

Optionally, the copper may be recovered from the residue as will cearly appear from the disclosure hereinafter.

DETAILS OF THE INVENTION

One embodiment employed in carrying the invention to practice is illustrated in the accompanying flow sheet. In the first unit operation, a water slurry is prepared containing by weight about 9% concentrate and 18% $Na_2CO_3$, the amount of $Na_2CO_3$ being sufficient to react with all of the S and Mo present plus a sufficient excess to provide a terminal pH of about 10.

As shown in step 1 of the flow sheet, the slurry is pressure leached at 300° C. and 2400 psig. Air is injected into the slurry and the reaction continued for 1 hour.

The reactions involved are as follows:

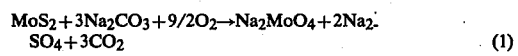

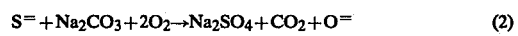

The reacted slurry is subjected to solid/liquid separation (step 2 of the flow sheet), to provide molybdenum solution 3 containing dissolved sodium molybdate and sodium sulfate and to provide copper-containing residue 3A. The sodium molybdate solution goes to the molybdenum solvent extraction (SX) circuit 4 while the residue is sent to the copper leaching circuit 4A.

In preparing the molybdenum solution for solvent extraction, the pH is adjusted to about 8 with $H_2SO_4$ and filtered to remove impurities, primarily $SiO_2$. The pH is then further reduced with $H_2SO_4$ to about 3.5 in preparation for extraction with an amine extractant. A typical amine extractant is one referred to by the trademark ADOGEN 283 which is di-tridecyl amine.

The extractant is mixed with a water-insoluble organic hydrocarbon carrier, preferably a kerosene such as one sold under the trademark Escaid 200 (EXXON) and an organic modifier such as nonanol (2,6,8 trimethyl-4 nonanol) in a typical composition of 12.5 volume-percent Adogen 283, 75 volume-percent Escaid 200, and 12.5 volume-percent nonanol. In place of Adogen 238, other secondary or tertiary amines may be used. An example of an acceptable tertiary amine is Alamine 336 (tri-caprylyl amine). The amine chosen must be practically insoluble in the aqueous solution, and soluble in the organic carrier.

The purpose of the modifier is to increase the rate and extent of disengagement of the organic and aqueous phases after mixing, and to prevent an organic-containing molybdenum compound, customarily referred to as "third phase", from precipitating. In place of the modifier nonanol, other alcohols, such as isodecanol, or phosphorous esters, such as tri-butyl phosphate, may be used, provided that they are practically insoluble in the aqueous solution and soluble in the organic solution.

In order to extract the molybdenum from the aqueous molybdenum-containing feed solution, said solution is contacted and mixed with the water-insoluble organic extraction solution at an organic-to-aqueous ratio of about 1.2, and the molybdenum is extracted from the aqueous solution to provide a molybdenum-containing organic solution and a raffinate 5A containing sodium sulfate.

Following complete extraction, the water-insoluble molybdenum-containing organic extraction solution is stripped with $NH_4OH$ to provide an ammonium molybdate solution 5B and a molybdenum-free organic extraction solution which is recycled to extract more molybdenum from the aqueous feed solution. The ammonium molybdate solution is predetermined to contain over 200 gpl (grams per liter) $MoO_3$ equivalent. The raffinate 5A containing the sodium sulfate may be treated by electrodialysis in a membrane cell 6 to convert the sodium sulfate to NaOH (6A) which may be recycled to step 1 and to sulfuric acid 6B which may be used in the system for pH control. Alternatively, the raffinate may be neutralized with lime for disposal.

The ammonium molybdate solution is sent to crystallization 7 to provide ammonium molybdate crystals 7A, i.e. ADM.

The copper oxide residue is leached with 10% sulfuric acid solution at 4A in a 50% slurry for about 5 hours. Following leaching, the slurry 4B is passed to solid/liquid separator 8 with solids going to waste 8A and the copper solution 8B going to solvent extraction 9. The copper solution may contain 2 to 5 gpl Cu.

The pH of the copper solution is adjusted to about 2.5 and is contacted by a copper extractant, e.g. an extraction known by the tradename LIX 64N. The copper extractant is a phenolic oxime dissolved in kerosene, the O/A ratio being about 1 to 1.3.

The copper is extracted and the barren raffinate 9A which contains less than 80 ppm Cu is sent to waste treatment. The copper is stripped from the organic phase with spent electrolyte 10A (about 25 gpl Cu) from the copper tankhouse. This reconstituted strip liquor (about 50 gpl Cu) is returned to the copper tankhouse where copper is electrowon at 10 to provide spent electrolyte 10A and cathode copper 10B.

In summary, the invention comprises pressure leaching molybdenite or molybdenum sulfide concentrate in the presence of oxygen at elevated temperatures and pressures in an aqueous solution containing an alkali metal carbonate or hydroxide. Generally speaking, the leaching is carried out at a temperature ranging from about 150° C. to 325° C. in the presence of air at an elevated pressure ranging from about 1000 psig to 3000 psig for about $\frac{1}{4}$ hour to 4.

The concentrate may have a size ranging from about 400 mesh to less than 100 mesh U.S. Standard and pulped to a density by weight of about 5% to 15%, the amount of alkali metal carbonate or hydroxide in the pulp or slurry ranging by weight from about 10% to 25%, the amount of reagent being at least sufficient to provide a terminal pH of at least about 8 and generally ranging from about 8 to 10, e.g., 10.

Following leaching, the reacted slurry is subjected to solid/liquid separation to provide a pregnant liquor containing alkali metal molybdate and a residue containing copper oxide which is sent to copper recovery.

The pH of the pregnant liquor is adjusted to about 7 to 9 with $H_2SO_4$ and then filtered to remove impurities, such as $SiO_2$. The filtered pregnant liquor is then adjusted to a pH in the range of about 2.2 to 4.5 to prepare it for solvent extraction using an amine extractant selective to molybdenum. The general class of amines include secondary and tertiary amines, one in particular being known by the trademark ADOGEN 283 which comprises di-tridecyl amine.

The amine extractant is mixed with an organic of the type selected from the group consisting of hydrocarbon solvent known as kerosene, and a modifier of the type selected from the groups known as alcohols or phosphorus esters, the concentration of the amine ranging from about 5 to 20 volume-percent, the concentration of modifier ranging from about zero to 20 volume-percent, and the remainder of the solution being composed of kerosene.

The molybdenum is stripped from the organic using a solution of ammonium hydroxide ranging in concentration from about 5N to 15N to yield an ammonium molybdate solution $[(NH_4)_2MoO_4]$ containing at least about 50 gpl ammonium molybdate, e.g. 150 to 200 gpl.

The ammonium molybdate product is crystallized from solution by evaporative crystallization in either a continuous or batch crystallizer.

As stated hereinbefore, the raffinate remaining from molybdenum recovery may be neutralized with lime and discarded or the sodium sulfate therein processed by electrodialysis to produce NaOH for recycle to the high pressure leach. Likewise, the $H_2SO_4$ produced can be employed in the flow sheet for pH control.

Depending upon the copper content, the residue following high pressure leaching may be sent to waste treatment or the copper containing residue can be leached using sulfuric acid solution of concentration ranging by weight from about 5% to 20% at temperatures ranging from about 20° C. to 100° C.

The copper sulfate solution obtained is then subjected to solvent extraction using an extractant of phenolic oxime mixed with an organic of the type selected from the group consisting of hydrocarbon solvents known as kerosene, such as Kermac 470B, a typical composition for copper extraction comprising about 6% LIX 64N (phenolic oxime) in 94% Kermac 470B (trademark for a mixture of aliphatic and aromatic kerosenes).

The copper is stripped from the solvent using a solution containing sulfuric acid or a spent copper electroyte containing sulfuric acid. Generally, the sulfuric acid should range from about 100 gpl to 200 gpl. The solution containing the stripped copper is treated by electrolysis to recover the copper therein as cathode copper.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A hydrometallurgical process for the recovery of molybdenum values from a molybdenum disulfide concentrate containing copper which comprises:
   forming an aqueous slurry of finely divided molybdenum concentrate with an alkali metal compound selected from the group consisting of carbonates and hydroxides of alkali metals,
   the amount of alkali metal compound being sufficient to react with all of the sulfur and molybdenum present and sufficient excess to provide a terminal pH of at least about 8,
   pressure leaching said slurry in the presence of oxygen at an elevated temperature and pressure and for a time sufficient to effect conversion of said molybdenum values and provide a pregnant liquor of alkali metal molybdate and a residue containing copper oxide,
   separating said pregnant liquor from the residue,
   adjusting the pH of the pregnant liquor with $H_2SO_4$ to a range of about 7 to 9,
   filtering said pH-adjusted pregnant liquor to remove impurities therefrom and provide a purified filtrate,
   reducing the pH of said filtrate to a range of about 2.2 to 4.5,
   subjecting said filtrate to a solvent extraction step to remove the molybdenum values therefrom,
   and then stripping said molybdenum values from said solvent with an ammonium hydroxide solution of concentration sufficient to recover the molybdenum values therefrom as ammonium molybdate.

2. The process of claim 1, wherein the residue containing copper is leached with a sulfuric acid solution to recover the copper therefrom.

3. The process of claim 2, wherein the copper is extracted from the leach solution by solvent extraction and the copper stripped from the solvent using a solution containing sulfuric acid.

4. The process of claim 3, wherein the stripping solution is a spent copper electrolyte containing sulfuric acid.

5. The process of claim 1, wherein the molybdenum is recovered from the ammonium hydroxide stripping solution by crystallization.

6. A hydrometallurgical process for the recovery of molybdenum values from a molybdenum disulfide concentrate containing by weight about 40% to 55% molybdenum and 0.2% to 5.0% copper which comprises:
   forming an aqueous slurry of finely divided molybdenum concentrate with an alkali metal compound selected from the group consisting of carbonates and hydroxides of alkali metals,
   the amount of alkali metal compound being sufficient to react with all of the sulfur and molybdenum present and sufficient to provide a terminal pH ranging from about 8 to 10,
   pressure leaching said slurry in the presence of air at an elevated temperature of about 150° C. to 325° C. and a pressure of about 1000 psig to 3000 psig for a time sufficient to effect conversion of said molybdenum values and provide a pregnant liquor of alkali metal molybdate and a residue containing copper oxide,
   separating said pregnant liquor from the residue,
   adjusting the pH of the pregnant liquor with $H_2SO_4$ to a range of about 7 to 9,
   filtering said pH-adjusted pregnant liquor to remove impurities therefrom and provide a purified filtrate,
   reducing the pH of said filtrate to a range of about 2.2 to 4.5,
   subjecting said filtrate to a solvent extraction step to remove the molybdenum values therefrom,
   said solvent extractant being one which is selective to an ammonium hydroxide stripping solution,
   and then stripping said molybdenum values from said solvent with an ammonium hydroxide solution of concentration sufficient to recover the molybdenum values therefrom as ammonium molybdate.

7. The process of claim 1, wherein the residue containing copper is leached with a sulfuric acid solution to recover copper therefrom.

8. The process of claim 7, wherein the copper is extracted from the leach solution by solvent extraction and the copper stripped from the solvent using a solution containing sulfuric acid.

9. The process of claim 8, wherein the stripping solution is a spent copper electrolyte containing sulfuric acid.

10. The process of claim 6, wherein the extractant for the molybdenum values is selected from the group consisting of secondary and tertiary amines.

11. The process of claim 10, wherein the extractant is di-tridecyl amine.

12. The process of claim 6, wherein the molybdenum is recovered from the ammonium hydroxide stripping solution by crystallization.

* * * * *